Sept. 2, 1941.    H. RINIA    2,254,624
DEVICE FOR SCANNING FILMS
Filed May 23, 1939

INVENTOR
HERRE RINIA
BY
ATTORNEY

Patented Sept. 2, 1941

2,254,624

UNITED STATES PATENT OFFICE 2,254,624

DEVICE FOR SCANNING FILMS

Herre Rinia, Eindhoven, Netherlands, assignor, by mesne assignments, to Radio Corporation of America, New York, N. Y., a corporation of Delaware Application May 23, 1939, Serial No. 275,142
In the Netherlands May 28, 1938

4 Claims. (Cl. 178—7.6)

This invention has reference to a device for the scanning of films.

Figure 1:
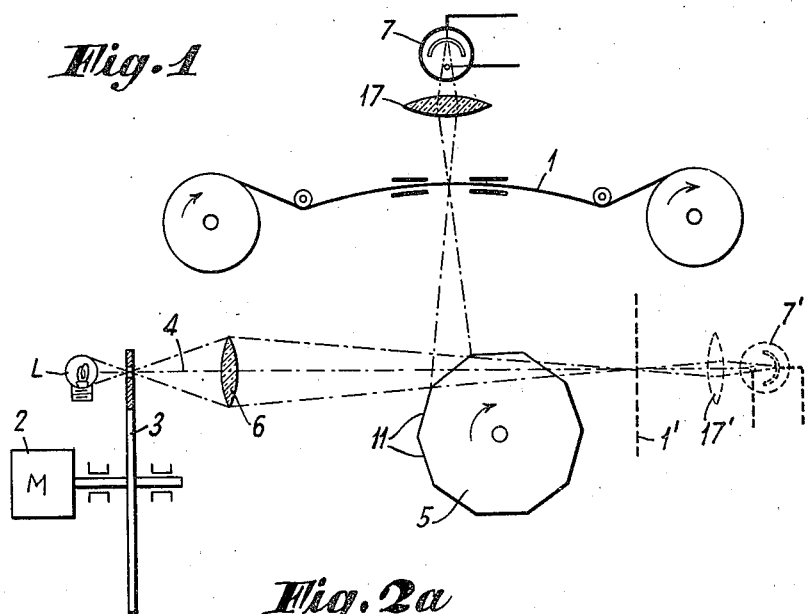
Figure 2A:
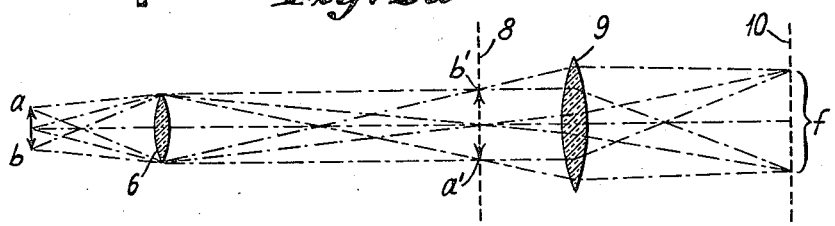
Figure 2B:
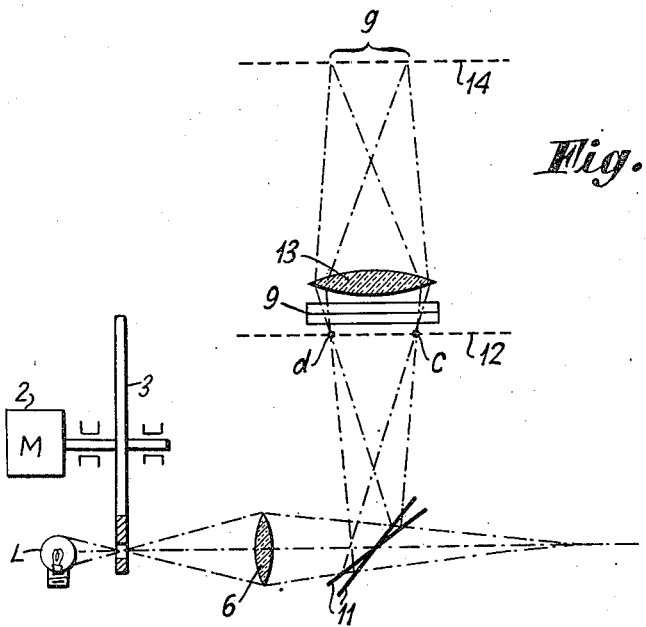

The invention may best be understood by referring to the drawing, wherein Figure 1 represents schematically a conventional scanning system and Figures 2a and 2b represent improvements in the system in accordance with the present invention.

It is known to scan a periodically or continuously moving film 1 (Figure 1) by means of a scanning disc 3 driven by an electric motor 2, the openings of which are arranged on the circumference of a circle so that the light beam 4 emitted by a source of light L and falling each time through one of the openings of the disc makes a to-and-fro movement. The direction of this movement is perpendicular to the moving direction of the film and will hereinafter be referred to as "horizontal direction." This to-and-fro moving light beam strikes a rotating or oscillating, reflecting or refracting surface, for example, a mirror wheel 5, due to which the light beam on rotating the mirror wheel is also moved in the moving direction of the film, said direction hereinafter being referred to as "vertical direction." For the purpose of focusing the light beam in a point at the place of the film, a lens 6 is provided, by means of which the film 1 has a luminous point thrown on it which scans successively each picture in sequent lines as a result of the two scanning movements of the disc 3 and the mirror wheel 5. Behind the film there is arranged a photoelectric cell 7 or similar device, for example a so-called electron multiplier which is struck by the light beam transmitted by the film, as shown in dotted lines by the path of light in Figure 1. In addition, a lens 17 is generally provided between the film 1 and the photoelectric cell 7, projecting the film gate onto the photoelectric cell.

A drawback of the device of the above mentioned type is that the part of the cathode of the photoelectric cell 7 which is struck by light changes each time with the point of the film scanned at that moment. Since the sensitivity of the cathode is not equally high throughout the surface, the amplitude of the picture currents produced in the photocell will accordingly not be varied in accordance with the brightness of the scanned points of the picture.

In the described device the path of light is inversed in some cases so that the photocell 7 and the source of light L change their places. In that case the disadvantage is prevalent that the amplitude of the picture currents produced in the photocell is not varied in accordance with the brightness of the scanned points of the picture, in this case, however, due to the fact that a source of light such as, for example, an arc-lamp has no uniform surface brightness.

In order to obviate this drawback a lens system is provided according to the invention between the film and the photoelectric cell.

In the device shown in Figure 1 the luminous spot undergoes two movements on the cathode of the photoelectric cell 7, that is to say a movement in horizontal direction produced by the movement of the light beam falling through the openings in the scanning disc 3, due to which this light beam moves in a plane perpendicular to the plane of the drawing, and a movement in vertical direction produced by the movement of the reflecting wheel 5 due to which the light beam undergoes a movement in the plane of the drawing.

Figures 2a and 2b represent respectively the movements of the scanning light beam in horizontal and in vertical direction. For clearness sake the change in direction of the light beam due to the reflecting surface 5 has been omitted on considering the horizontal scanning movement, but the movement of the light beam over the virtual picture 1' of the film 1 located behind the reflecting surface (Figure 1) and of the cathode of the photoelectric cell 7' (Figure 1) is represented.

Figure 2a shows the movement of a luminous point from a to b due to the rotation of the scanning disc 3. Said luminous points are projected successively by means of the lens 6 onto the film 1, the virtual picture of which is located at the place of the plane 8. Thus a horizontal line a' b' of the film is scanned. If the virtual picture 7' of the photoelectric cell 7 would be located directly behind the plane 8, or if the line a' b' would be projected onto the cathode of the cell 7 by means of a spherical lens 17 whose virtual picture 17' is located between the plane 8 and the virtual picture 7' of the photoelectric cell 7, the point at which the cathode is struck by the light beam transmitted by the film would be varied in accordance with the place of the points of the film line a' b' which are successively scanned. In order to obviate this drawback and to make the striking point of the cathode independent of the horizontal scanning movement, a lens concentrating at least in horizontal direction, for example a cylindrical lens 9 is provided according to the invention in the plane 10 between the film in the plane 8 and the photoelectric cell. The place of the lens 9 and its strength are so chosen that in the plane 10 a picture of the lens 6 is produced which is sharply defined in horizontal direction. Since the whole lens 6 is uniformly illuminated independently of the place of the luminous point on the line a—b, always the same surface f of the cathode will be illuminated due to the lens 6 being projected by the lens 9 onto the photo-cathode in the plane 10.

Besides the movement of the luminous spot incident on the photo-cathode in horizontal direction which is eliminated by the lens 9, the scanning light-beam undergoes, in addition, a movement in vertical direction as shown in Figure 2b. This movement in vertical direction produces a periodical displacement of the surface f over the photo-cathode.

Figure 2b shows the two extreme positions of a reflecting surface 11 of the reflecting wheel 5 (Figure 1). Due to the movement of the reflecting surface between these two positions the scanning of the film 1 which is located at the place of the plane 12, is obtained in vertical direction since the scanning light beam moves from the point c on the film to the point d.

If now only the cylindrical lens 9 would be placed between the photo-cell 7 and the film 1 leaving the vertical movement of the light beam unaffected, the picture of the lens 6 on the photo-cathode, as mentioned before, would be periodically displaced. In order to obviate this displacement and to make the illuminated surface f independent of the vertical scanning movement, a cylindrical lens 13 is provided the axis of which is perpendicular to the axis of the lens 9. The strength and the place of the lens 13 are so chosen that in the plane 14 of the photo-cathode a picture of the reflecting surface 11 is produced which is sharply defined in vertical direction. In that case always the same surface g of the photo-cathode is illuminated independently of the position of the reflecting surface 11.

It is, of course, obvious that the horizontal movement of the scanning beam of light through the film 1 in the plane 12 is effected in exactly the same manner as the horizontal scanning of the virtual image of the film in the plane 8.

The same remark applies to the luminous spot f which is produced on the virtual picture of the photo-cathode in the plane 10 so that f forms the horizontal dimension of the luminous spot thrown on the photo-cathode in the plane 14.

Summarizing the magnitude of the stationary luminous spot incident on the photo-cathode is limited in horizontal direction by the magnitude of f which is determined by the width of the lens 6 in horizontal direction and by the enlargement or diminution of the lens 9, whereas the luminous spot is limited in vertical direction by the magnitude of g which is determined approximately by the dimension in vertical direction of the illuminated part of the reflecting surface 11 and by the enlargement or diminution of the lens 13.

The lens 9 does not affect the dimension of the luminous spot in vertical direction and neither does the lens 13 on the dimension f of the luminous spot in horizontal direction, since each of the cylindrical lenses 9 and 13 has only a concentrating effect in one direction.

The two cylindrical lenses 9 and 13 may be substituted by a spherical lens in combination with a cylindrical lens producing together the same effect as the two cylindrical lenses. This combination in turn may be substituted for a sphero-cylindrical or sphero-torical lens.

This invention is preferably applied to the device for scanning continuously moving films which is described in the Dutch patent application No. 86,162.

I claim:

1. A device for scanning films to produce a series of television signals including a source of light, means for moving a light beam emitted by said source in a horizontal direction at a predetermined rate of speed, means for simultaneously moving the beam of light in a vertical direction at a different rate of speed, a first lens system to concentrate the beam of light into a cross-section of substantially elemental area at the plane of the film, a light responsive cell positioned to receive the light beam after its transmission through the film, a second lens system including a cylindrical lens positioned between the film and the light responsive cell for projecting an image of said first lens system on the light responsive cell so that the light transmitted by the film is projected on to a substantially fixed and reduced area of the cathode of the light responsive cell whereby the illuminated area of the cathode of the cell will not be altered by the movements of the beam of light.

2. A device as claimed in claim 1, in which the said second lens system includes two cylindrical lenses, the axes of which are normal to each other and coincide with the horizontal and vertical movements of the light beam.

3. A device for scanning films comprising means for moving a light beam emitted by a source of light in a horizontal direction, a reflecting surface arranged in the path of the light beam for producing a movement of the beam of light, a first lens system in the path of the light beam to concentrate and focus the light beam in a point at the plane of the film, a photoelectric cell positioned on the opposite side of the film to receive the light transmitted by the film, and a second lens system positioned between the film and the photoelectric cell comprising two cylindrical lenses with their axes arranged parallel to the vertical and horizontal movements of the light beam respectively for projecting an image of said first lens system on the light responsive cell so that the light transmitted by the film is projected onto a substantialy fixed and reduced area on the cathode of the photo-electric cell.

4. A device for scanning films to produce television signals comprising a beam of light, means for moving the beam in a horizontal direction, additional means arranged in the path of the beam of light for producing vertical movement of the beam, a first lens system positioned in the path of the light beam to concentrate and focus the light beam in a point at the plane of the film, a photoelectric cell positioned on the opposite side of the film to receive the light transmitted by the film, a second lens system comprising two cylindrical lenses, the axes of which are arranged in horizontal and vertical directions, said second lens system being positioned between the film and the photoelectric cell for projecting an image of said first lens system on the light responsive cell whereby the light transmitted by the film is projected onto a predetermined fixed area of the cathode of the photoelectric cell and is not affected by the movements of the light beam.

HERRE RINIA.